(12) United States Patent
Hui et al.

(10) Patent No.: US 8,942,301 B2
(45) Date of Patent: Jan. 27, 2015

(54) DYNAMIC SUBCARRIER UTILIZATION AND INTELLIGENT TRANSMISSION SCHEDULING

(75) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 13/563,524

(22) Filed: Jul. 31, 2012

(65) Prior Publication Data

US 2013/0251054 A1     Sep. 26, 2013

Related U.S. Application Data

(60) Provisional application No. 61/614,975, filed on Mar. 23, 2012.

(51) Int. Cl.
*H01L 27/28* (2006.01)

(52) U.S. Cl.
USPC .......................................................... 375/260

(58) Field of Classification Search
USPC .......................................................... 375/260
See application file for complete search history.

(56) References Cited

U.S. PATENT DOCUMENTS

| | | | |
|---|---|---|---|
| 6,072,773 | A | 6/2000 | Fichou et al. |
| 6,118,791 | A | 9/2000 | Fichou et al. |
| 6,192,248 | B1 | 2/2001 | Solondz |
| 6,424,624 | B1 | 7/2002 | Galand et al. |
| 6,934,340 | B1 | 8/2005 | Dollard |
| 7,327,697 | B1 | 2/2008 | Friday et al. |
| 7,352,688 | B1 | 4/2008 | Perahia et al. |
| 7,352,718 | B1 | 4/2008 | Perahia et al. |
| 7,359,311 | B1 | 4/2008 | Paranjpe et al. |
| 7,466,981 | B1 | 12/2008 | Abdelhamid et al. |

(Continued)

FOREIGN PATENT DOCUMENTS

| | | |
|---|---|---|
| EP | 1388954 A2 | 2/2004 |
| GB | 2443009 A | 4/2008 |

(Continued)

OTHER PUBLICATIONS

Pettersson, et al., "Invitation to pay Additional Fees, and Where Applicable, Protest Fee", Patent Cooperation Treaty, PCT/US2013/033485, mailed Aug. 20, 2013, 5 pages, European Patent Office, Rijswijk, Netherlands.

(Continued)

*Primary Examiner* — Kevin Kim
(74) *Attorney, Agent, or Firm* — Parker Ibrahim & Berg LLC; James M. Behmke; Stephen D. LeBarron

(57) ABSTRACT

In one embodiment, a transmitting device monitors transmission activity of each of a plurality of subcarriers in a communication network, and determines a set of unutilized subcarriers of the plurality of subcarriers. As such, the transmitting device may then transmit a data frame on one or more of the unutilized subcarriers to a receiving device while transmission activity is present on one or more utilized subcarriers within the network. In another embodiment, the transmitting device may also determine timing information associated with the transmission activity, and may correspondingly schedule the transmitting to optimize network performance based on the timing information.

22 Claims, 7 Drawing Sheets

(56) References Cited

U.S. PATENT DOCUMENTS

| | | |
|---|---|---|
| 7,593,356 B1 | 9/2009 | Friday et al. |
| 7,616,604 B2 | 11/2009 | Abdelhamid et al. |
| 7,724,650 B2 | 5/2010 | Karam |
| 7,787,897 B2 | 8/2010 | Banh et al. |
| 7,884,763 B2 | 2/2011 | Na et al. |
| 7,925,268 B2 | 4/2011 | Sanders et al. |
| 7,995,525 B1 | 8/2011 | Perahia et al. |
| 8,031,786 B2 | 10/2011 | Wang et al. |
| 8,040,831 B2 | 10/2011 | Kurtz et al. |
| 8,068,552 B2 | 11/2011 | Wang et al. |
| 8,073,489 B2 | 12/2011 | Liu et al. |
| 8,082,347 B2 | 12/2011 | Abdelhamid et al. |
| 8,130,875 B2 | 3/2012 | Liu et al. |
| 8,134,503 B2 | 3/2012 | Na et al. |
| 8,145,272 B2 | 3/2012 | Wang et al. |
| 8,218,677 B2 | 7/2012 | Jin et al. |
| 8,218,969 B2 | 7/2012 | Forghieri et al. |
| 8,249,509 B2 | 8/2012 | Wang et al. |
| 8,374,105 B1 | 2/2013 | Perahia et al. |
| 8,379,524 B1 | 2/2013 | Jacobs et al. |
| 8,411,807 B1 | 4/2013 | Rangarajan et al. |
| 8,416,802 B2 | 4/2013 | Jin et al. |
| 2006/0294246 A1 | 12/2006 | Stieglitz et al. |
| 2007/0026868 A1 | 2/2007 | Schulz et al. |
| 2007/0165521 A1* | 7/2007 | Malik et al. ............... 370/229 |
| 2009/0190535 A1 | 7/2009 | Hassan et al. |
| 2009/0310692 A1 | 12/2009 | Kafle et al. |
| 2010/0142540 A1 | 6/2010 | Matheney et al. |
| 2010/0162329 A1 | 6/2010 | Ford et al. |
| 2011/0026630 A1 | 2/2011 | Stager et al. |
| 2011/0176583 A1* | 7/2011 | Choi et al. ............... 375/211 |
| 2011/0236013 A1 | 9/2011 | Gazzola et al. |

FOREIGN PATENT DOCUMENTS

| | | |
|---|---|---|
| WO | WO-0239631 A1 | 5/2002 |
| WO | WO-2008144323 A1 | 11/2008 |

OTHER PUBLICATIONS

Pettersson, et al., "Notification of Transmittal of the International Search Report and the Written Opinion of the International Searching Authority, or the Declaration", Patent Cooperation Treaty, International Application No. PCT/US2013/033504, mailed Aug. 20, 2013, 9 pages, European Patent Office, Rijswijk, Netherlands.

Pettersson, et al., "Invitation to pay Additional Fees, and Where Applicable, Protest Fee", Patent Cooperation Treaty, PCT/US2013/033522, mailed Aug. 20, 2013, 5 pages, European Patent Office, Rijswijk, Netherlands.

Xu, et al., "Hierarchical Opportunistic Scheduling in Multi-Service OFDMA Networks", International Conference on Wireless Communications, Networking and Mobile Computing, Sep. 2007, pp. 2004-2007, Institute of Electrical and Electronics Engineers, Piscataway, New Jersey.

Hui, et al., "Techniques for Use in Orthogonal Frequency Division Multiplexing (OFDM) Communication Networks", U.S. Appl. No. 61/614,975, filed Mar. 23, 2012, 48 pages.

Jain, et al., "Practical, Real-Time, Full Duplex Wireless", ACM, MobiCom '11, Proceedings of the 17th Annual International Conference on Mobile Computing and Networking, Las Vegas, Nevada, Sep. 2011, pp. 301-312.

Winter; et al., "RPL: IPv6 Routing Protocol for Low-Power and Lossy Networks", Internet Engineering Task Force, Request for Comments 6550, Mar. 2012, 157 pages.

Rummery, et al., "Notification of Transmittal of the International Search Report and the Written Opinion of the International Searching Authority, or the Declaration", Patent Cooperation Treaty, International Application No. PCT/US2013/033485, mailed Nov. 8, 2013, 14 pages, European Patent Office, Rijswijk, The Netherlands.

Rummery, et al., "Notification of Transmittal of the International Search Report and the Written Opinion of the International Searching Authority, or the Declaration", Patent Cooperation Treaty, International Application No. PCT/US2013/033522, mailed Nov. 8, 2013, 15 pages, European Patent Office, Rijswijk, The Netherlands.

* cited by examiner

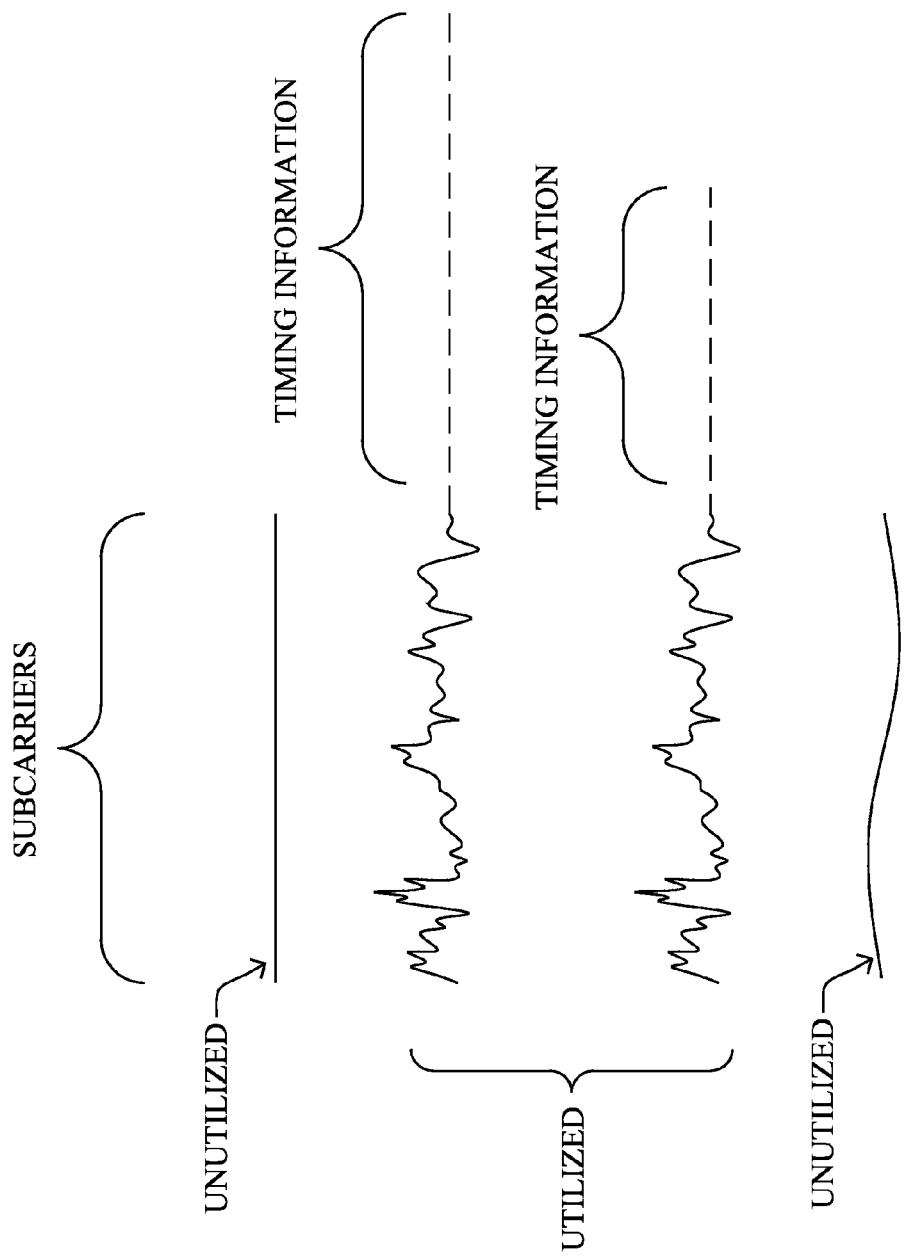

"43," and

DYNAMIC SUBCARRIER UTILIZATION AND INTELLIGENT TRANSMISSION SCHEDULING

RELATED APPLICATION

The present application claims priority to U.S. Provisional Patent Application Ser. No. 61/614,975, filed Mar. 23, 2012, entitled TECHNIQUES FOR USE IN ORTHOGONAL FREQUENCY DIVISION MULTIPLEXING (OFDM) COMMUNICATION NETWORKS, by Hui et al, the contents of which are hereby incorporated by reference.

TECHNICAL FIELD

The present disclosure relates generally to communication networks, and, more particularly, to communication networks employing orthogonal frequency division multiplexing (OFDM).

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

To help provide greater throughput and robustness, Orthogonal Frequency Division Multiplexing (OFDM) utilizes additional bandwidth by allowing transmission of multiple data streams across orthogonal subcarriers simultaneously to increase throughput. Adjusting the number of subcarriers and code-rate can vastly change the effective throughput of the link. In addition, Adaptive Tone Mapping is a process that dynamically selects which subcarriers and coding parameters use when transmitting a data frame. The goal of Adaptive Tone Mapping is to maximize throughput and minimize channel utilization by only transmitting on usable subcarriers and optimizing the code-rate without sacrificing robustness. Current techniques for selection, allocation, and utilization of subcarriers, however, offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example of subcarrier utilization;

DESCRIPTION OF EXAMPLE EMBODIMENTS

Overview

Figure 1:
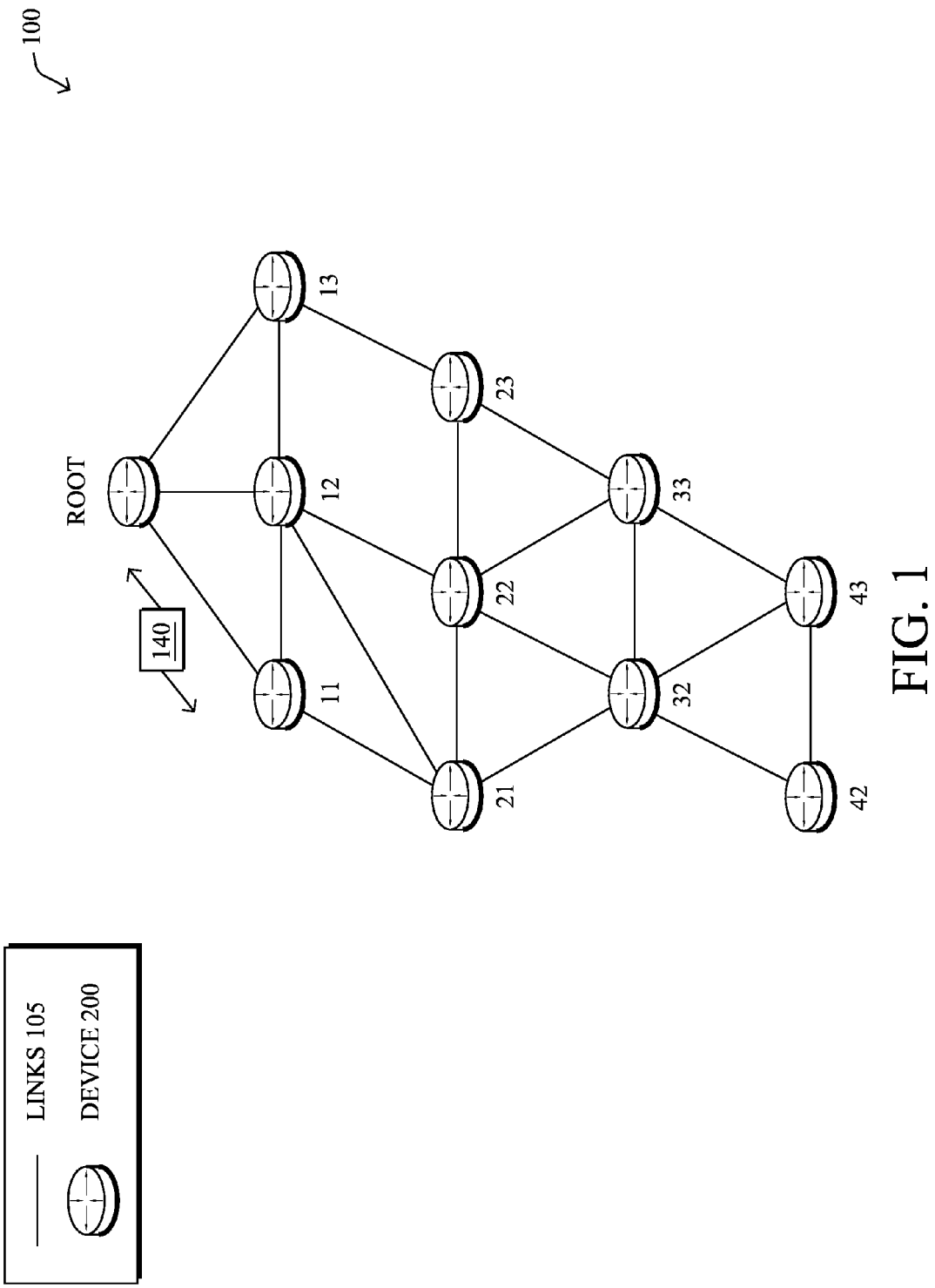
FIG. 1 illustrates an example communication network.

According to one or more embodiments of the disclosure, a transmitting device monitors transmission activity of each of a plurality of subcarriers in a communication network, and determines a set of unutilized subcarriers of the plurality of subcarriers. As such, the transmitting device may then transmit a data frame on one or more of the unutilized subcarriers to a receiving device while transmission activity is present on one or more utilized subcarriers within the network. Note that in one or more additional embodiments, the transmitting device may also determine timing information associated with the transmission activity, and may correspondingly schedule the transmitting to optimize network performance based on the timing information.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," … "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
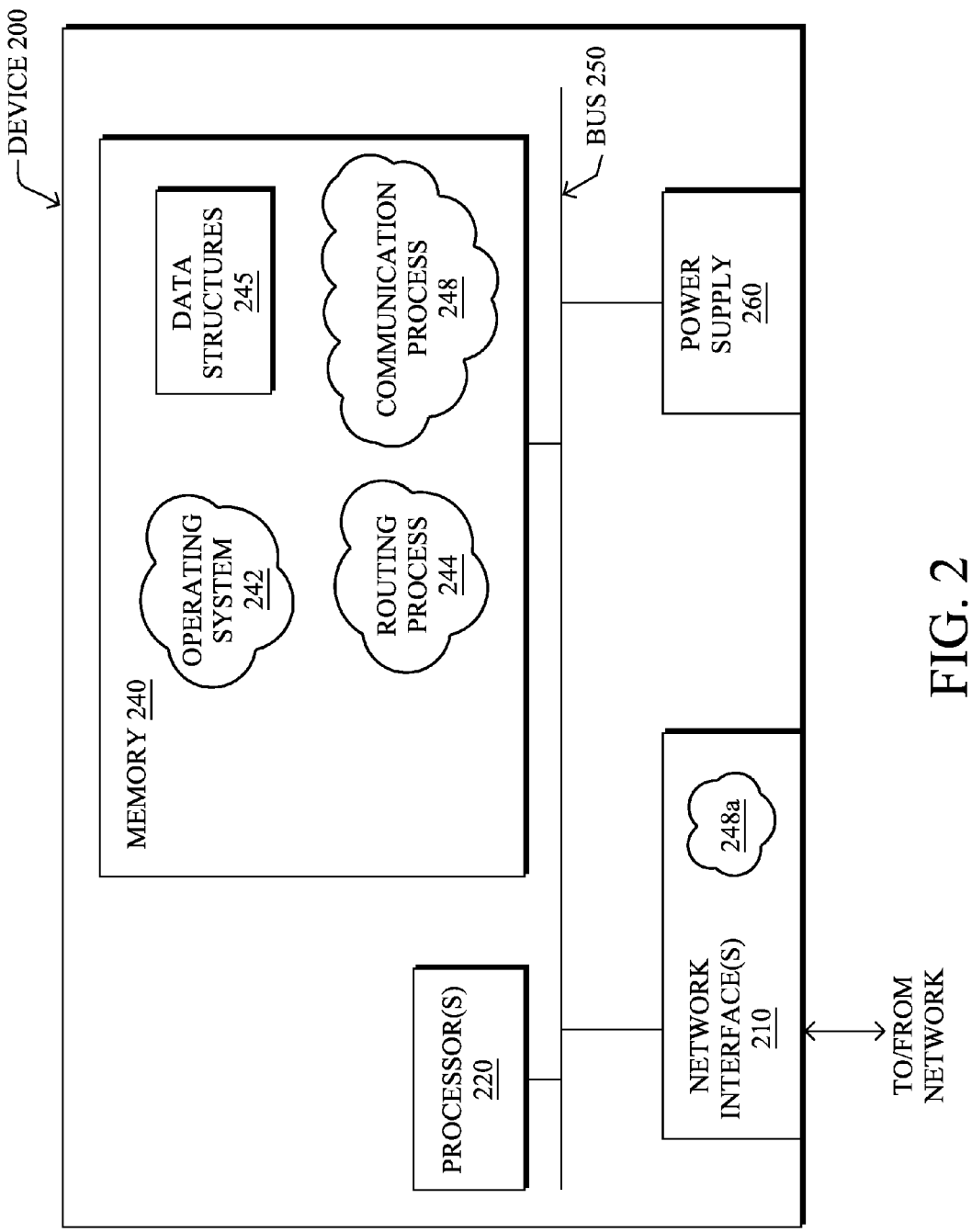
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244 (for routing devices), and a communication process 248, as described herein. Note that while the communication process 248 is shown in centralized memory 240, alternative embodiments provide for the process to be specifically operated within the network interfaces 210, such as a component of the MAC or PHY layer of the interface.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 (on routing-capable devices) contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network.

Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

As noted, though, LLNs face a number of communication challenges:

1) LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g. transmissions from other transceivers) to months (e.g. seasonal changes of outdoor environment).

2) Low-cost and low-power designs limit the capabilities of the transceiver. In particular, LLN transceivers typically provide low throughput. Furthermore, LLN transceivers typically support limited link margin, making the effects of interference and environmental changes visible to link and network protocols.

3) Shared-media communication networks, such as power-line communication (PLC) networks (a type of communication over power-lines), provide an enabling technology for networking communication and can be used for example in AMI networks, and are also useful within home and buildings. Interestingly, PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

To help provide greater throughput and robustness, Orthogonal Frequency Division Multiplexing (OFDM) is being standardized by IEEE 802.15.4 g, HomePlug, and IEEE P1901.2. OFDM utilizes additional bandwidth by allowing transmission of multiple data streams across orthogonal subcarrier simultaneously to increase throughput. With optimal erasure codes (e.g., Reed-Solomon), a data frame can be coded across multiple subcarriers to tolerate erasures across different subcarriers and even the complete loss of an individual subcarrier during a packet transmission. In addition, repetition codes may also be applied to provide extremely robust communication, albeit at a very low throughput (known as "ROBO" mode in HomePlug and IEEE P1901.2). Adjusting the number of subcarriers and code-rate can vastly change the effective throughput of the link. For IEEE P1901.2, the effective throughput can range from 2.4 kbps to 34.2 kbps, notably more than an order of magnitude difference.

In addition, Adaptive Tone Mapping is a process that dynamically selects which subcarriers and coding parameters use when transmitting a data frame. The goal of Adaptive Tone Mapping is to maximize throughput and minimize channel utilization by only transmitting on usable subcarriers and optimizing the code-rate without sacrificing robustness. HomePlug and IEEE P1901.2 currently provides mechanisms to send a Tone Map Request (TMREQ) to a neighboring device. HomePlug and IEEE P1901.2 currently require that all TMRs be sent using all available subcarriers to allow the receiver to evaluate the quality on each subcarrier. The quality may be represented as one or more of signal-to-noise-ratio (SNR), bit-error rate, frame-error rate, etc. Upon receiving a TMREQ, a device evaluates the quality of each subcarrier and includes them in a Tone Map Reply (TMREP). Devices maintain a neighbor table indicating the quality of each subcarrier, allowing them to perform tone mapping for subsequent transmissions to optimize throughput.

Current techniques for selection, allocation, and utilization of subcarriers, however, offer room for improvement. Therefore, various techniques are hereinafter shown and described for use with OFDM-based communication networks.

Illustratively, the techniques described herein may be performed by hardware, software, and/or firmware, such as in accordance with the communication process 248, which may contain computer executable instructions executed by the processor 220 (or independent processor of interfaces 210) to perform functions relating to the novel techniques described herein. For example, the techniques herein may be treated as extensions to conventional communication protocols, such as the various protocols that utilize OFDM communication (e.g., wireless protocols, PLC protocols, or other shared media protocols), and as such, may be processed by similar components understood in the art that execute those protocols, accordingly.

Determining Transmission Subcarriers Based on Current Transmission Activity

Existing OFDM systems (e.g., P1901.2 and 802.15.4 g) select the Tone Map based on the quality information contained in the neighbor table. Because the transceivers communicate over a shared medium, a transmitter must wait until all of the active subcarriers are idle before it can begin transmission. As a result, this can cause the shared medium to appear as a single communication channel where only one active transmission can occur at a time.

Current OFDM systems, such as HomePlug and IEEE P1901.2, select the optimal set of subcarriers irrespective of the current channel occupancy in the network. A device cannot begin transmitting until all active subcarriers are idle. As a result, even though OFDM communicates over a number of subcarriers, all subcarriers often appears as a single channel.

Orthogonal Frequency Division Multiple Access (OFDMA) is a multi-user version of OFDM, where different users (i.e., devices) are assigned different subsets of the available subcarriers. This approach ensures that different devices will not utilize common portions of the spectrum. This approach does not, however, allow devices to opportunistically take advantage of any subcarriers that are currently being unused.

The techniques herein, however, determine the active subcarriers based on current transmission activity on OFDM-based LLNs. That is, the techniques provide for a mechanism that allows a device to utilize the fact that OFDM communicates over multiple subcarriers to treat the OFDM communication channel as multiple independent channels. In particular, this invention allows multiple transmissions to occur simultaneously, which maximizes the overall spectral efficiency, increasing throughput, and lowering latency.

Specifically, according to one or more embodiments of the disclosure as described in detail below, simultaneous communication by neighboring devices is allowed in OFDM networks, where devices monitor the transmit activity on each independent subcarrier, dynamically select subcarriers when transmitting a message based on the transmit activity, and intelligently schedule transmissions that optimizes overall network performance. This is in contrast with existing approaches that either treat all subcarriers collectively as a single channel or multi-user systems that assign subcarrier subsets to particular devices.

Operationally, the techniques herein allow neighboring devices to initiate their own transmissions in parallel without interfering on OFDM-based LLNs. By allowing parallel transmissions, the overall network makes better use of the available spectrum, increasing effective throughput and reducing latency of the network as a whole. Such improvements are critical in LLN environments where communication resources are highly constrained. For example, P1901.2 throughput ranges between 2.4 kbps and 34.2 kbps.

The techniques herein comprise one or more of three illustrative aspects:

1) Having devices track the transmit activity on each individual subcarrier (or each group of subcarriers) individually;

2) Dynamically adjusting the selection of subcarriers when transmitting a frame based on the transmit activity; and 3) Intelligently scheduling transmissions to optimize network performance (e.g., to maximize throughput and reduce latency).

===Subcarrier Transmit Activity Tracking===

A first aspect of the techniques herein involves having a device continuously monitor the current transmission activity of each group of subcarriers, where a group may consist of one subcarrier. Existing systems typically maintain some form of averaged moving window to support Clear Channel Assessment (CCA) required for CSMA/CA MACs. The techniques herein augment the subcarrier monitoring to include timing information. In particular, when a device properly decodes a preamble, start-of-frame, and frame length, the device then records not only that the subcarrier has an active transmission but also the duration of the active transmission, e.g., as illustrated in FIG. 3. Notably, the devices maintain this information for each subcarrier independently. When using RTS/CTS (request to send/clear to send) mechanisms, the devices may be augmented to also utilize CTS as an indicator of transmission activity to hidden terminals.

Maintaining such information across all subcarriers simultaneously in an OFDM-based system is a key aspect to the techniques herein. Note that both 802.15.4 g and P1901.2 treat all subcarriers as a single channel and any detected transmit activity on any subcarrier will prevent a device from initiating transmission. More importantly, such information may be used to support the following aspects of the techniques herein.

===Adjusting Subcarriers Based on Transmit Activity===

A second aspect of the techniques herein involves dynamically adjusting the set of subcarriers to use when transmitting a message. The transmitting device first determines the set of subcarriers that are not currently experiencing transmission activity. Using only those subcarriers, the device may then determine the optimal transmission parameters for the intended receiver using the subcarrier quality information stored in the neighbor table. Note that while existing systems utilize subcarrier quality information stored in the neighbor table to determine the optimal transmission parameters, they do so irrespective of the current subcarrier transmission activity.

Active transmissions will decrease the number of usable (unutilized) subcarriers when communicating with a receiver, thus increasing the transmission time for the frame. However, this increase in transmit time may be more than compensated herein by the fact that the device now has the option to begin transmission immediately rather than delaying until the current transmission is completed.

Figure 4A:
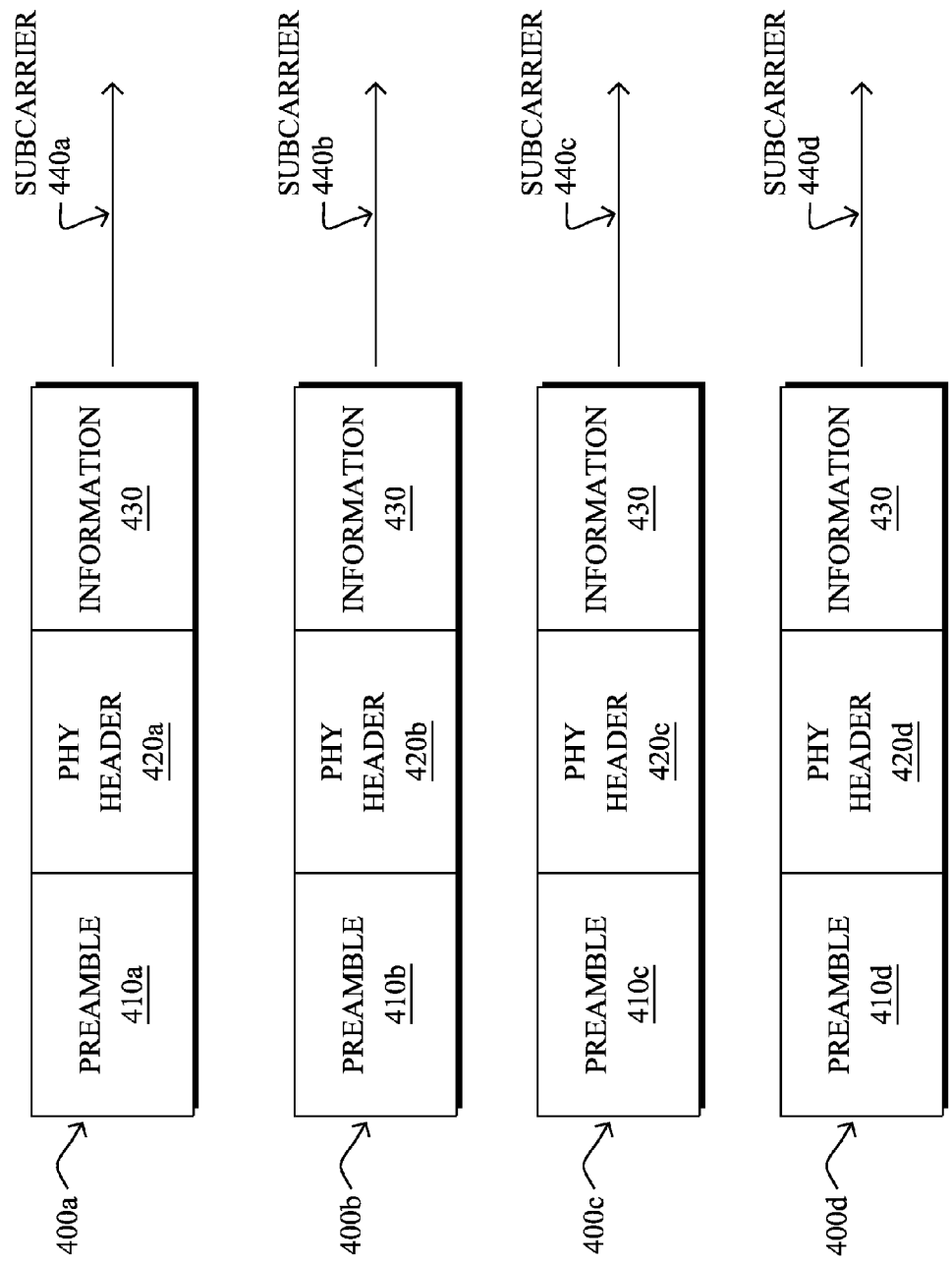
FIGS. 4A-4B illustrate an example of preamble and header transmission for subcarriers and sub-channels.
Figure 4B:
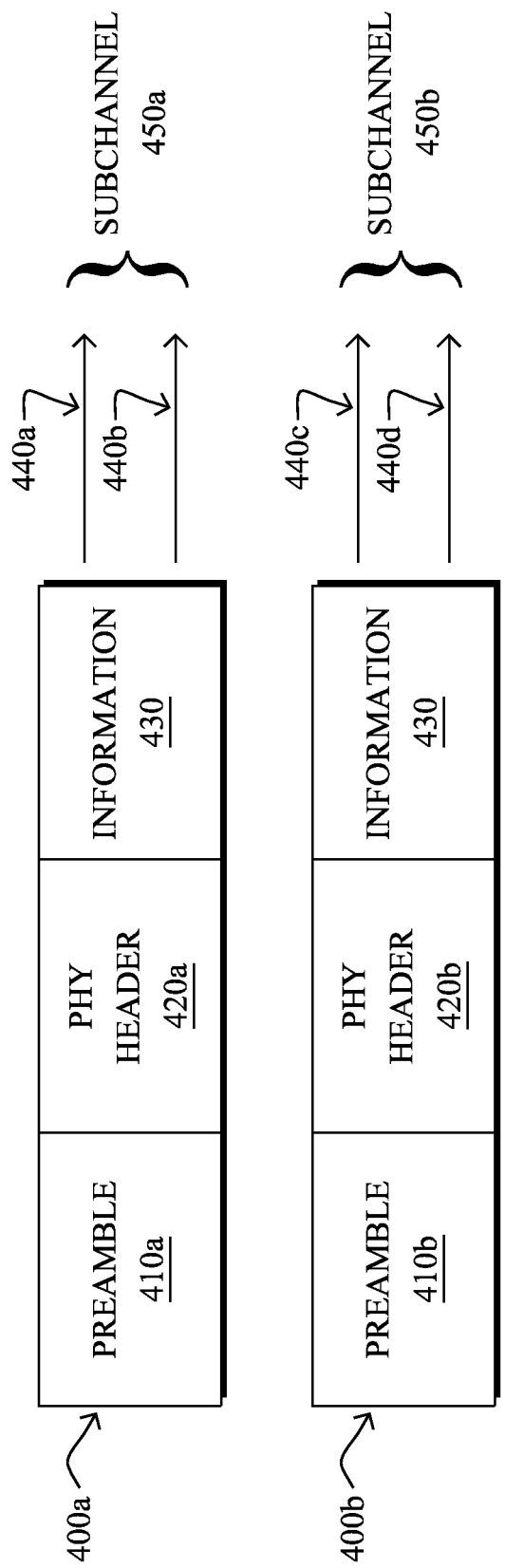

Whereas OFDMA allocates subcarrier subsets to individual users, the techniques herein allow devices to opportunistically consume available subcarriers as needed. As a result, unlike HomePlug and P1901.2, the techniques herein cannot assume that receiving devices already know what subcarriers are used to transmit the preamble and physical (PHY) header. In one embodiment, as shown in FIG. 4A, for a message 400(*a-d*), a device may transmit the preamble 410(*a-d*) and PHY header 420(*a-d*) with given information 430 on each individual subcarrier 440(*a-d*) such that a receiver can determine the subcarrier subsets by decoding any individual subcarrier. (That is, the information 430 is the same on each subcarrier.) In another embodiment, as shown in FIG. 4B, the subcarriers may be grouped into sub-channels 450(*a-b*), where a device may utilize one or more sub-channels at a time, but must transmit the preamble and PHY header on each individual sub-channel. Using sub-channels forms a tradeoff—a device must utilize combinations of sub-channels (rather than subcarriers), but the overhead of transmitting a preamble and PHY header is reduced. In general, where an "individual subcarrier" is used herein, an individual group of one or more subcarriers may be implied.

===Scheduling Transmissions===

A third aspect of the techniques herein involves intelligently scheduling transmissions based on the current transmission activity. In particular, a device may (i) choose to initiate a transmission using a subset of available subcarriers immediately or (ii) wait until a later time in hopes that more subcarriers will be available to reduce overall transmission time.

In one embodiment, a device can schedule transmissions based on the expected finish time for the two approaches and select the approach that results in the quickest finish time (closest end time or shortest transmission time). This is an optimistic approach that attempts to minimize communication latency. However, one downside with this approach is that it could result in "subcarrier fragmentation", where high contention can lead to different devices only utilizing a small number of subcarriers simultaneously.

In another embodiment, devices may only initiate a parallel transmission if the new transmission will finish before the current active transmission. If a device detects multiple active transmissions, then the new transmission must finish before the packet that is expected to finish first. This approach helps reduce the amount of "subcarrier fragmentation" by ensuring devices detecting transmission activity do not arbitrarily "extend" a current transmission by initiating another parallel transmission.

Figure 5:
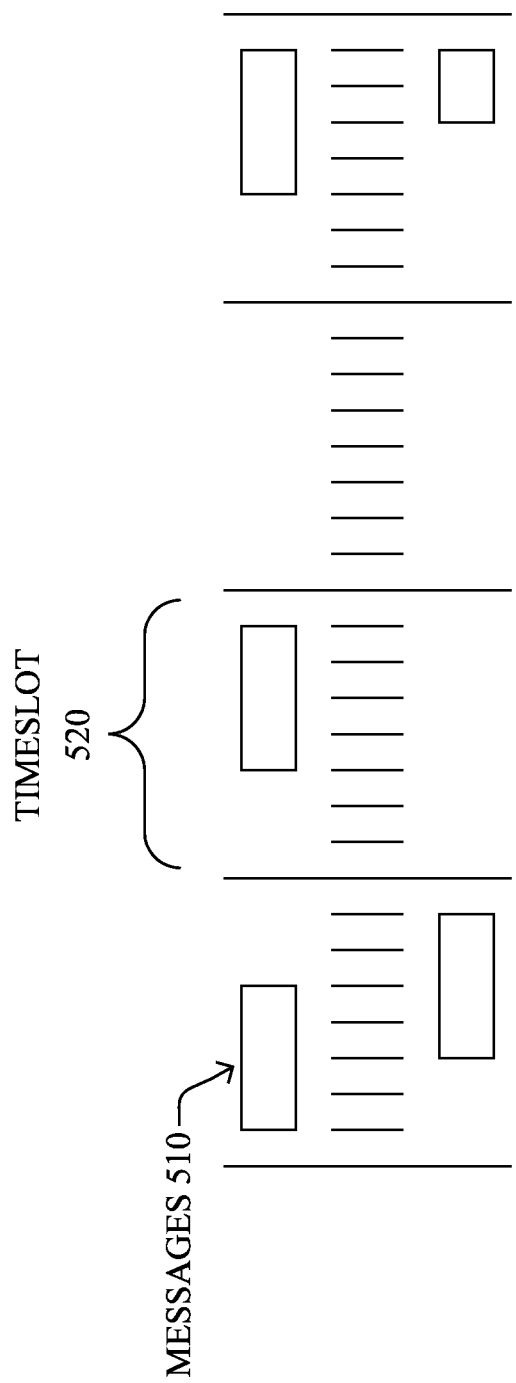
FIG. 5 illustrates an example of timeslots.

In yet another embodiment, a local or global slotted approach may be used to completely eliminate "subcarrier fragmentation". In the slotted approach, as illustrated in FIG. 5, devices must limit frame transmissions 510 to within a timeslot 520. In doing so, the slot boundaries ensure that all subcarriers will eventually be void of any transmissions, allowing devices to utilize any of the subcarriers as necessary.

Notably, the techniques herein may face loop interference that occurs when attempting to transmit and receive on the same device. Fortunately, significant efforts have been made to cancel loop interference, using digital cancellation (e.g., 50-70 dB) with antenna or balun cancellation. This amount of cancellation helps mitigate the loop interference issue for all subcarriers, including those immediately adjacent to the subcarriers used for transmission.

Moreover, regarding the ability to detect and determine the duration of a transmission, replicating the receive hardware is not always desirable. For a variety of reasons (e.g., decoding errors, changing channel conditions, etc.) a device need not have complete knowledge of the surrounding transmit activity durations on all subcarriers. As a result, the device could collect information as best it can with the available hardware. After detecting a preamble, start-of-frame, and frame length, the device records the information and returns back to the preamble detection state. Note that the transmission duration information may be considered as an optimization, rather than a requirement.

Furthermore, the transmit activity on the transmitter side may not be representative of the transmit activity on the receiver side, leading to the well-known hidden terminal problem. This problem exists in the current P1901.2 specification, which uses only CSMA-CA. The basic form of the techniques herein does not address the hidden-terminal problem. However, extending the techniques herein to utilize Clear-to-Send (CTS) messages may include information about the transmit activity on each subcarrier.

For reiteration, the techniques herein describe three different embodiments to schedule transmissions based on knowledge of the subcarrier transmission durations:

1) Optimistic Method: In determining when to transmit a data frame, the device computes a number of potential transmit start times and associated finishing times. The first start time is if the device immediately begins transmission. All subsequent start times are based on when subcarriers become available. For each start time, the device computes an expected finish time based on the number of available subcarriers at that time. With each evaluation, the device stores the minimum finish time and stops evaluating when it can no longer improve the finish time. This occurs when the start time exceeds the currently stored minimum finish time. The device then schedules the data frame transmission for that time. As noted above, one challenge with this approach is "subcarrier fragmentation", where only small subsets of subcarriers are ever available at any point in time. When detecting new activity, the device may need to reevaluate its decision. To avoid starvation, the device should begin transmission after some delay threshold.

2) Loose-Bound Method: This approach is a slight modification of the Optimistic Method described above. Whereas the Optimistic Method placed no constraints on when a transmission must finish, devices using the Loose-Bound method attempt to align the end of their transmissions with other transmissions to reduce the likelihood of "subcarrier fragmentation". When selecting among possible transmission start times, the transmitter attempts to avoid transmissions where surrounding transmission activity will finish between the start and finish time of its own transmission. Of course, there is no guarantee that such a condition will exist and the transmitter will need to fall back on the optimistic method above. For this reason, while the Loose-Bound method may help to reduce the occurrence of subcarrier fragmentation, it does not prevent the subcarrier fragmentation problem.

3) Slotted Method: This approach synchronizes the entire network to timeslots. For example, timeslots may be synchronized off of a frequency-hopping communication schedule, or other shared timeslot indication, such as global positioning clocks, network times, or in one embodiment, synchronizing off the zero-crossing of the AC power itself to achieve a synchronous time-base that devices can utilize to maintain synchronization. Using this method, devices must start and finish transmissions within the same slot. By prohibiting transmissions from crossing slot boundaries, all subcarriers are available at the beginning of each slot and effectively bounds the amount of time "subcarrier fragmentation" can occur. The slot duration must be at least as long as the worst-case transmission time. Note that within each slot, devices may use the Optimistic or Loose-Bound methods described above.

Figure 6:
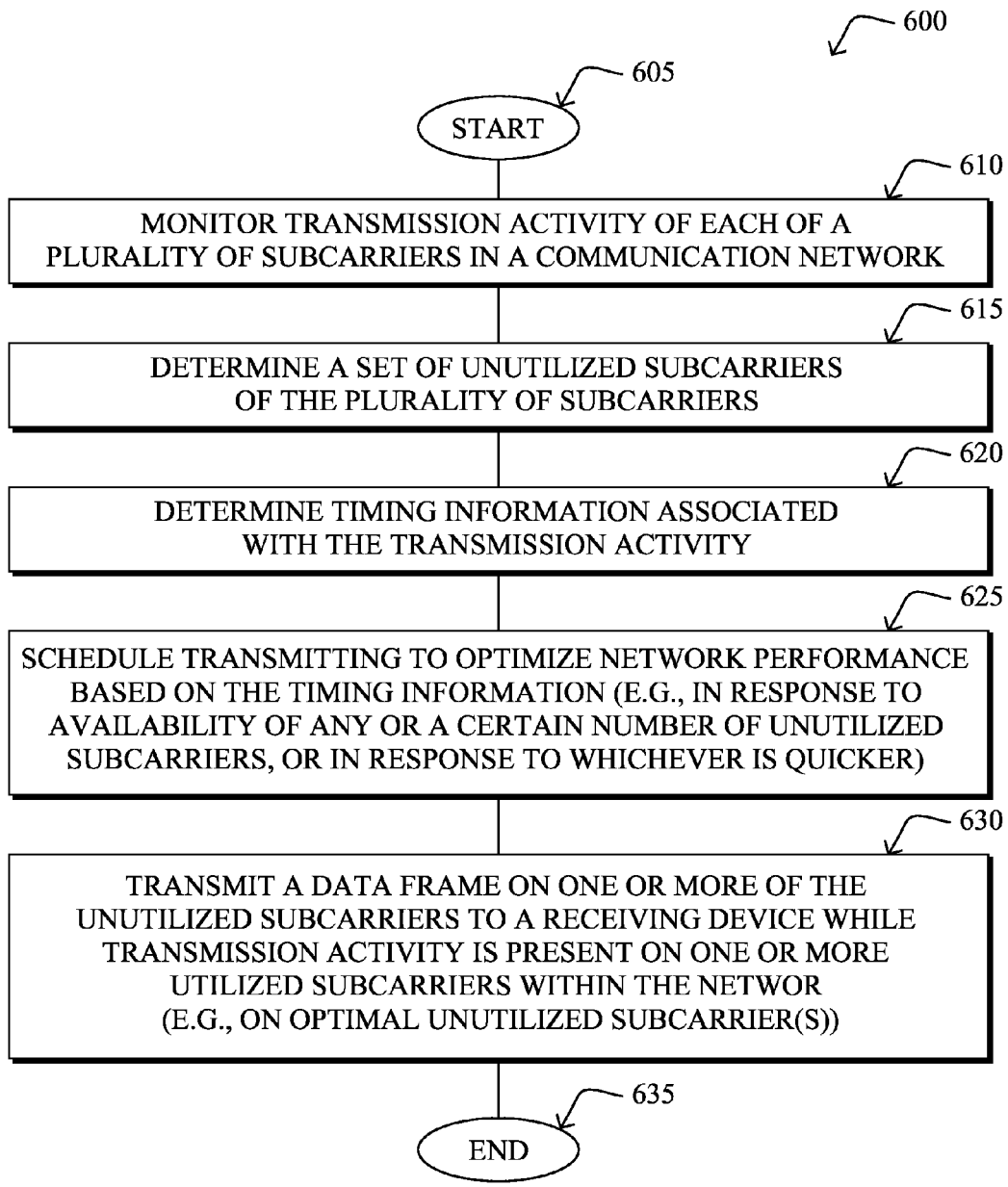
FIG. 6 illustrates an example simplified procedure for determining transmission subcarriers based on current transmission activity in an OFDM-based communication network.

FIG. 6 illustrates an example simplified procedure 600 for determining transmission subcarriers based on current transmission activity in an OFDM-based communication network in accordance with one or more embodiments described herein. The procedure 600 may start at step 605, and continues to step 610, where, as described in greater detail above, a transmitting device monitors transmission activity of each of a plurality of subcarriers in a communication network, and determines a set of unutilized subcarriers of the plurality of subcarriers in step 615. Note that in certain embodiments, the transmitting device may also determine timing information associated with the transmission activity in step 620. As described above, in step 625 the transmitting device may correspondingly schedule transmitting to optimize network performance based on the timing information (e.g., in response to availability of any or a certain number of unutilized subcarriers, or in response to whichever is quicker). In step 630, the transmitting device may then transmit a data frame on one or more of the unutilized subcarriers to a receiving device while transmission activity is present on one or more utilized subcarriers within the network (e.g., on optimal unutilized subcarrier(s)), and the simplified illustrative procedure 600 may end in step 635.

It should be noted that while certain steps within procedure 600 may be optional as described above, the steps shown in FIG. 6 are merely examples for illustration, and certain other steps may be included or excluded as desired. For example, a receiving device may be configured to receive the message on the "unutilized" subcarriers, and may interpret the message according to the techniques described above, accordingly. Further, while a particular order of the steps is shown, this ordering is merely illustrative, and any suitable arrangement of the steps may be utilized without departing from the scope of the embodiments herein.

The techniques described herein, therefore, provide for determining transmission subcarriers based on current transmission activity in an OFDM-based communication network. In particular, the techniques allow neighboring devices to transmit data frames simultaneously in an independent way to increase overall network performance (e.g., increase throughput and reduce latency). Such performance enhancements are critical in networks that already operate with very constrained communication resources.

While there have been shown and described illustrative embodiments of techniques for use with OFDM-based communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   monitoring transmission activity of each of a plurality of subcarriers in a communication network;
   determining a set of unutilized subcarriers of the plurality of subcarriers and timing information associated with the transmission activity;
   transmitting a data frame on one or more of the unutilized subcarriers to a receiving device while transmission activity is present on one or more utilized subcarriers within the network based on the timing information; and
   scheduling the transmitting to optimize network performance based on the timing information.

2. The method as in claim 1, wherein scheduling comprises:
   transmitting the data frame substantially immediately in response to availability of the one or more of the unutilized subcarriers.

3. The method as in claim 1, wherein scheduling comprises:
   transmitting the data frame in response to availability of a sufficient number of unutilized subcarriers to meet a determined transmission timing.

4. The method as in claim 1, wherein scheduling comprises:
   determining a first finish time associated with transmitting the data frame substantially immediately in response to availability of the one or more of the unutilized subcarriers;
   determining a second finish time associated with transmitting the data frame in response to availability of a sufficient number of unutilized subcarriers to meet a determined transmission timing; and
   selecting whether to transmit the data frame substantially immediately or in response to availability of a sufficient number of unutilized subcarriers based on the quickest finish time of the first and second finish times.

5. The method as in claim 1, wherein scheduling comprises:
   initiating the transmitting only when the transmitting will finish before a current active transmission.

6. The method as in claim 5, wherein scheduling comprises:
   detecting multiple active transmissions; and, in response,
   initiating the transmitting only when the transmitting will finish before the current active transmission of the multiple active transmissions that is expected to finish first.

7. The method as in claim 1, wherein scheduling comprises:
   limiting frame transmissions on any subcarrier to within a single timeslot shared across all subcarriers.

8. The method as in claim 1, wherein transmitting comprises:
   transmitting a preamble and physical (PHY) header of the data frame on each individual subcarrier with information as to which one or more subcarriers will be used for the transmitting, such that decoding any individual subcarrier allows the receiving device to determine which one or more subcarriers will be used for the transmitting.

9. The method as in claim 1, further comprising:
   grouping subcarriers into sub-channels;
   wherein monitoring transmission activity of each of the plurality of subcarriers comprises monitoring transmission activity of each of a plurality of sub-channels;
   wherein determining the set of unutilized subcarriers of the plurality of subcarriers comprises determining a set of unutilized sub-channels of the plurality of sub-channels; and
   wherein transmitting the data frame on one or more of the unutilized subcarriers comprises transmitting the data frame on one or more of the unutilized sub-channels to the receiving device while transmission activity is present on one or more utilized sub-channels.

10. The method as in claim 9, wherein transmitting comprises:
    transmitting a preamble and physical (PHY) header of the data frame on each individual sub-channel with information as to which one or more sub-channels will be used for the transmitting, such that decoding any individual sub-channel allows the receiving device to determine which one or more sub-channels will be used for the transmitting.

11. The method as in claim 1, further comprising:
    selecting, based on an optimal tone map, an optimal subcarrier from the set of unutilized subcarriers; and
    transmitting the data frame on the optimal subcarrier to the receiving device.

12. An apparatus, comprising:
    a network interface adapted to communicate data frames over a network using one or more of a plurality of subcarriers in a communication network;
    a processor coupled to the network interfaces and adapted to execute one or more processes; and
    a memory configured to store a process executable by the processor, the process when executed operable to:

monitor transmission activity of each of a plurality of subcarriers in the communication network;

determine a set of unutilized subcarriers of the plurality of subcarriers and timing information associated with the transmission activity;

transmit a data frame on one or more of the unutilized subcarriers to a receiving device while transmission activity is present on one or more utilized subcarriers within the network based on the timing information; and schedule the transmission to optimize network performance based on the timing information.

13. The apparatus as in claim 12, wherein the process when executed to schedule is further operable to:

transmit the data frame substantially immediately in response to availability of the one or more of the unutilized subcarriers.

14. The apparatus as in claim 12, wherein the process when executed to schedule is further operable to:

transmit the data frame in response to availability of a sufficient number of unutilized subcarriers to meet a determined transmission timing.

15. The apparatus as in claim 12, wherein the process when executed to schedule is further operable to:

determine a first finish time associated with transmitting the data frame substantially immediately in response to availability of the one or more of the unutilized subcarriers;

determine a second finish time associated with transmitting the data frame in response to availability of a sufficient number of unutilized subcarriers to meet a determined transmission timing; and select whether to transmit the data frame substantially immediately or in response to availability of a sufficient number of unutilized subcarriers based on the quickest finish time of the first and second finish times.

16. The apparatus as in claim 12, wherein the process when executed to schedule is further operable to:

initiate the transmitting only when the transmitting will finish before a current active transmission.

17. The apparatus as in claim 12, wherein the process when executed to schedule is further operable to:

limit frame transmissions on any subcarrier to within a single timeslot shared across all subcarriers.

18. The apparatus as in claim 12, wherein the process when executed to transmit is further operable to:

transmit a preamble and physical (PHY) header of the data frame on each individual subcarrier with information as to which one or more subcarriers will be used for the transmitting, such that decoding any individual subcarrier allows the receiving device to determine which one or more subcarriers will be used for the transmitting.

19. The apparatus as in claim 12, wherein the process when executed is further operable to:

group subcarriers into sub-channels;

wherein monitoring transmission activity of each of the plurality of subcarriers comprises monitoring transmission activity of each of a plurality of sub-channels;

wherein determining the set of unutilized subcarriers of the plurality of subcarriers comprises determining a set of unutilized sub-channels of the plurality of sub-channels; and wherein transmitting the data frame on one or more of the unutilized subcarriers comprises transmitting the data frame on one or more of the unutilized sub-channels to the receiving device while transmission activity is present on one or more utilized sub-channels.

20. The apparatus as in claim 19, wherein the process when executed to transmit is further operable to:

transmit a preamble and physical (PHY) header of the data frame on each individual sub-channel with information as to which one or more sub-channels will be used for the transmitting, such that decoding any individual sub-channel allows the receiving device to determine which one or more sub-channels will be used for the transmitting.

21. The apparatus as in claim 12, wherein the process when executed is further operable to:

select, based on an optimal tone map, an optimal subcarrier from the set of unutilized subcarriers; and transmit the data frame on the optimal subcarrier to the receiving device.

22. A tangible, non-transitory, computer-readable media having software encoded thereon, the software when executed by a processor operable to:

monitor transmission activity of each of a plurality of subcarriers in a communication network;

determine a set of unutilized subcarriers of the plurality of subcarriers and timing information associated with the transmission activity; and transmit a data frame on one or more of the unutilized subcarriers to a receiving device while transmission activity is present on one or more utilized subcarriers within the network based on the timing information; and schedule the transmission to optimize network performance based on the timing information.

* * * * *